(12) United States Patent
Koch et al.

(10) Patent No.: US 8,565,903 B2
(45) Date of Patent: Oct. 22, 2013

(54) CRITICAL RESOURCE NOTIFICATION SYSTEM AND INTERFACE DEVICE

(75) Inventors: Edward Lee Koch, San Rafael, CA (US); Daniel Allan Hennage, Mill Valley, CA (US); Wesley Clay Collier, Piedmont, NV (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/298,706

(22) Filed: Nov. 17, 2011

(65) Prior Publication Data

US 2012/0066397 A1 Mar. 15, 2012

Related U.S. Application Data

(63) Continuation of application No. 12/245,560, filed on Oct. 3, 2008, now Pat. No. 8,073,558.

(60) Provisional application No. 60/977,909, filed on Oct. 5, 2007.

(51) Int. Cl.
*G06F 19/00* (2011.01)
(52) U.S. Cl.
USPC .............. 700/17; 700/286; 700/94; 719/318
(58) Field of Classification Search
USPC ...................... 700/17, 94, 286, 291; 719/318; 709/231, 203; 714/49
See application file for complete search history.

(56) References Cited

U.S. PATENT DOCUMENTS

| 4,110,827 A | 8/1978 | Shavit |
| 4,130,874 A | 12/1978 | Pai |
| 4,153,936 A | 5/1979 | Scmitz et al. |
| 4,419,667 A | 12/1983 | Gurr et al. |
| 4,850,010 A | 7/1989 | Stanbury et al. |
| 4,937,760 A | 6/1990 | Beitel et al. |
| 5,341,142 A | 8/1994 | Reis et al. |

(Continued)

FOREIGN PATENT DOCUMENTS

| WO | WO 2005033964 | 4/2005 |
| WO | WO 2008027455 | 3/2008 |
| WO | WO 2008027457 | 3/2008 |
| WO | WO 2009/006133 | 1/2009 |
| WO | WO 2009/020606 | 2/2009 |
| WO | WO 2009/023230 | 2/2009 |

(Continued)

OTHER PUBLICATIONS

U.S. Appl. No. 12/895,640, filed Sep. 30, 2010.

(Continued)

*Primary Examiner* — Kidest Bahta
(74) *Attorney, Agent, or Firm* — Seager Tufte & Wickhem LLC.

(57) ABSTRACT

A system and device that communicates critical resource information is described. The resource notification system comprises a resource distributor, a resource notification server, and a networked interface device. The resource distributor generates a demand response action that is associated with a particular resource. The resource distributor is also communicatively coupled to a wide area network. The resource notification server, which is also communicatively coupled to the wide area network, receives and processes the demand response action and generates a demand response event signal that is communicated to a customer list. The networked interface device comprises at least one indicator. The networked interface device receives the demand response event signal that triggers at least one indicator corresponding to the demand response action generated by the resource distributor, wherein the indicator provides a real-time indication that corresponds to the usage of the particular resource.

16 Claims, 8 Drawing Sheets

Resource Notification System

(56) References Cited

U.S. PATENT DOCUMENTS

| | | | |
|---|---|---|---|
| 5,500,561 A | 3/1996 | Wilhelm | |
| 5,566,084 A | 10/1996 | Cmar | |
| 5,572,438 A | 11/1996 | Ehlers et al. | |
| 5,598,349 A | 1/1997 | Elliason et al. | |
| 5,719,854 A | 2/1998 | Choudhury et al. | |
| 5,822,553 A | 10/1998 | Gifford et al. | |
| 5,892,758 A | 4/1999 | Argyroudis | |
| 6,026,375 A | 2/2000 | Hall et al. | |
| 6,195,367 B1 | 2/2001 | Jakobik et al. | |
| 6,209,018 B1* | 3/2001 | Ben-Shachar et al. | 718/105 |
| 6,252,950 B1 | 6/2001 | Duty et al. | |
| 6,259,723 B1 | 7/2001 | Miyashita | |
| 6,278,717 B1 | 8/2001 | Arsenault et al. | |
| 6,289,384 B1* | 9/2001 | Whipple et al. | 709/229 |
| 6,366,926 B1* | 4/2002 | Pohlmann et al. | 1/1 |
| 6,446,136 B1* | 9/2002 | Pohlmann et al. | 719/318 |
| 6,519,509 B1 | 2/2003 | Nierlich et al. | |
| 6,529,723 B1 | 3/2003 | Bentley | |
| 6,566,926 B1 | 5/2003 | Patterson | |
| 6,574,581 B1 | 6/2003 | Bohrer et al. | |
| 6,832,249 B2 | 12/2004 | Ciscon et al. | |
| 6,865,685 B2 | 3/2005 | Hammond et al. | |
| 6,985,087 B2 | 1/2006 | Soliman | |
| 7,010,700 B1 | 3/2006 | Foss et al. | |
| 7,039,532 B2 | 5/2006 | Hunter | |
| 7,069,309 B1* | 6/2006 | Dodrill et al. | 709/219 |
| 7,260,616 B1 | 8/2007 | Cook | |
| 7,333,880 B2 | 2/2008 | Brewster et al. | |
| 7,337,237 B2* | 2/2008 | Salahshoor et al. | 709/245 |
| 7,346,467 B2 | 3/2008 | Bohrer et al. | |
| 7,392,115 B2 | 6/2008 | Schindler | |
| 7,401,086 B2 | 7/2008 | Chorafakis et al. | |
| 7,528,503 B2 | 5/2009 | Rognli et al. | |
| 7,565,227 B2 | 7/2009 | Richard et al. | |
| 7,650,289 B2 | 1/2010 | Cooper et al. | |
| 7,676,657 B2 | 3/2010 | Lindholm et al. | |
| 7,702,424 B2 | 4/2010 | Cannon et al. | |
| 7,742,953 B2 | 6/2010 | King et al. | |
| 7,775,191 B2 | 8/2010 | Hou | |
| 7,797,009 B2 | 9/2010 | Kiiskila et al. | |
| 7,806,845 B2 | 10/2010 | Arm et al. | |
| 7,845,576 B2 | 12/2010 | Siddaramanna et al. | |
| 7,865,252 B2 | 1/2011 | Clayton | |
| 7,873,441 B2 | 1/2011 | Synesiou et al. | |
| 7,885,718 B2 | 2/2011 | Yano et al. | |
| 7,886,166 B2 | 2/2011 | Shnekendorf et al. | |
| 7,925,384 B2 | 4/2011 | Huizenga | |
| 7,941,528 B2 | 5/2011 | Hicks, III et al. | |
| 7,954,726 B2 | 6/2011 | Siddaramanna et al. | |
| 7,958,229 B2 | 6/2011 | Conway | |
| 8,023,410 B2 | 9/2011 | O'Neill | |
| 8,073,558 B2 | 12/2011 | Koch et al. | |
| 8,091,794 B2 | 1/2012 | Siddaramanna et al. | |
| 8,140,658 B1 | 3/2012 | Gelvin et al. | |
| 8,163,276 B2 | 4/2012 | Hedrick et al. | |
| 8,170,774 B2 | 5/2012 | Forte et al. | |
| 8,183,995 B2 | 5/2012 | Wang et al. | |
| 8,199,773 B2 | 6/2012 | Aubin et al. | |
| 8,232,745 B2 | 7/2012 | Chemel et al. | |
| 8,234,876 B2 | 8/2012 | Parsonnet et al. | |
| 8,260,468 B2 | 9/2012 | Ippolito et al. | |
| 8,260,650 B2 | 9/2012 | Miller | |
| 8,291,243 B2 | 10/2012 | Castelli et al. | |
| 8,327,024 B2 | 12/2012 | Pattison et al. | |
| 8,352,094 B2 | 1/2013 | Johnson et al. | |
| 8,373,547 B2 | 2/2013 | Benya et al. | |
| 8,406,937 B2 | 3/2013 | Verfuerth et al. | |
| 8,417,391 B1 | 4/2013 | Rombouts et al. | |
| 2003/0016237 A1 | 1/2003 | Hickey | |
| 2003/0033230 A1 | 2/2003 | McCall | |
| 2003/0233064 A1 | 12/2003 | Arm et al. | |
| 2004/0034484 A1 | 2/2004 | Solomita, Jr. et al. | |
| 2004/0137897 A1 | 7/2004 | Teixeira | |
| 2004/0203649 A1 | 10/2004 | Cashiola | |
| 2005/0027636 A1 | 2/2005 | Gilbert et al. | |
| 2005/0152694 A1 | 7/2005 | Chown | |
| 2005/0172304 A1 | 8/2005 | Tavares et al. | |
| 2005/0194456 A1 | 9/2005 | Tessier et al. | |
| 2005/0229220 A1 | 10/2005 | Fisher et al. | |
| 2005/0262026 A1 | 11/2005 | Watkins | |
| 2007/0005195 A1 | 1/2007 | Pasquale et al. | |
| 2007/0222295 A1 | 9/2007 | Wareham et al. | |
| 2008/0011864 A1 | 1/2008 | Tessier et al. | |
| 2008/0046715 A1 | 2/2008 | Balazs et al. | |
| 2008/0167931 A1 | 7/2008 | Gerstemeier et al. | |
| 2008/0177678 A1 | 7/2008 | Di Martini et al. | |
| 2008/0262848 A1 | 10/2008 | Shienbrood et al. | |
| 2009/0046625 A1 | 2/2009 | Diener et al. | |
| 2009/0092062 A1 | 4/2009 | Koch et al. | |
| 2009/0187499 A1 | 7/2009 | Mulder et al. | |
| 2009/0198384 A1 | 8/2009 | Ahn | |
| 2009/0204977 A1 | 8/2009 | Tavares et al. | |
| 2009/0271255 A1 | 10/2009 | Utter et al. | |
| 2009/0281674 A1 | 11/2009 | Taft | |
| 2009/0295594 A1 | 12/2009 | Yoon | |
| 2009/0297488 A1 | 12/2009 | Fraser et al. | |
| 2009/0313083 A1 | 12/2009 | Dillon et al. | |
| 2009/0319090 A1 | 12/2009 | Dillon et al. | |
| 2009/0326726 A1 | 12/2009 | Ippolito et al. | |
| 2010/0057480 A1 | 3/2010 | Arfin et al. | |
| 2010/0076615 A1 | 3/2010 | Daniel et al. | |
| 2010/0076835 A1 | 3/2010 | Silverman | |
| 2010/0088261 A1 | 4/2010 | Montalvo | |
| 2010/0106342 A1 | 4/2010 | Ko et al. | |
| 2010/0106543 A1 | 4/2010 | Marti | |
| 2010/0114340 A1 | 5/2010 | Huizenga et al. | |
| 2010/0138363 A1 | 6/2010 | Batterberry et al. | |
| 2010/0168924 A1 | 7/2010 | Tessier et al. | |
| 2010/0274377 A1 | 10/2010 | Kaufman et al. | |
| 2010/0283606 A1 | 11/2010 | Tsypin et al. | |
| 2010/0324962 A1 | 12/2010 | Nesler et al. | |
| 2011/0016200 A1 | 1/2011 | Koch | |
| 2011/0040550 A1 | 2/2011 | Graber et al. | |
| 2011/0040666 A1 | 2/2011 | Crabtree et al. | |
| 2011/0046805 A1 | 2/2011 | Bedros et al. | |
| 2011/0093493 A1 | 4/2011 | Nair et al. | |
| 2011/0113068 A1 | 5/2011 | Ouyang | |
| 2011/0125542 A1 | 5/2011 | Koch | |
| 2011/0172836 A1 | 7/2011 | Boss et al. | |
| 2011/0172838 A1 | 7/2011 | Pai et al. | |
| 2011/0196539 A1 | 8/2011 | Nair et al. | |
| 2011/0196546 A1 | 8/2011 | Muller et al. | |
| 2011/0199209 A1 | 8/2011 | Siddaramanna et al. | |
| 2011/0212700 A1 | 9/2011 | Petite | |
| 2011/0231320 A1 | 9/2011 | Irving | |
| 2011/0258049 A1 | 10/2011 | Ramer et al. | |
| 2011/0301774 A1 | 12/2011 | Koch | |
| 2012/0066397 A1 | 3/2012 | Koch et al. | |
| 2012/0066686 A1 | 3/2012 | Koch | |
| 2012/0093141 A1 | 4/2012 | Imes et al. | |
| 2012/0109399 A1 | 5/2012 | Tran | |
| 2012/0136915 A1 | 5/2012 | Koch et al. | |
| 2012/0173030 A1 | 7/2012 | Taft | |
| 2012/0197456 A1 | 8/2012 | Walter et al. | |
| 2012/0197457 A1 | 8/2012 | Walter et al. | |
| 2012/0197458 A1 | 8/2012 | Walter et al. | |
| 2012/0245968 A1 | 9/2012 | Beaulieu et al. | |
| 2012/0277920 A1 | 11/2012 | Koch | |
| 2013/0035992 A1 | 2/2013 | Silverman | |
| 2013/0079931 A1 | 3/2013 | Wanchoo et al. | |

FOREIGN PATENT DOCUMENTS

| | | |
|---|---|---|
| WO | WO 2009/027617 | 3/2009 |
| WO | WO 2009/085610 | 7/2009 |
| WO | WO 2011/065007 | 6/2011 |
| WO | WO 2013/025565 | 2/2013 |
| WO | WO 2013/055551 | 4/2013 |

OTHER PUBLICATIONS

U.S. Appl. No. 13/016,181, filed Jan. 28, 2011.
U.S. Appl. No. 13/016,265, filed Jan. 28, 2011.
U.S. Appl. No. 13/016,306, filed Jan. 28, 2011.

(56) References Cited

OTHER PUBLICATIONS

U.S. Appl. No. 13/272,086, filed Oct. 12, 2011.
U.S. Appl. No. 13/299,716, filed Nov. 18, 2011.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Cruz, "Tutorial on GPU Computing with an Introduction to CUDA," 37 pages, prior to Nov. 17, 2011.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
https://buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response for Small Commercial Buildings," Lawrence Berkele National Laboratory, Report No. LBNL-2195E, 104 pages, Jul. 2009.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkele National Laboratory, Report No. LBNL-2905E, 11 pages, Nov. 2009.
Koch et al., "Scenarios for Consuming Standardized Automated Demand Response Signals," Lawrence Berkele National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al. "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Holmberg, "Facility Interface to the Smart Grid," National Institute of Standards and Technology, 7 pages, printed 2012.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
European Search Report for Related Application No. EP 12169650.4, Dated Nov. 22, 2012.
U.S. Appl. No. 13/621,195 filed Sep. 15, 2012.
"Smart Demand Response: A Discussion Paper," Energy Networks Association, energyuk, 44 pages, prior to Nov. 29, 2012.
International Search Report for PCT ApplicationSerial No. pct/us2012/058537, International Filing Date Oct. 3, 2012.
U.S. Appl. No. 13/689,551, filed Nov. 29, 2012.
http://www.naesb.org/pdf3/dsmee012308213.doc, "Demand Response Measurement and Verification Literature Review," 29 pages, created Jan. 14, 2008, modified Dec. 18, 2012.
Hunt, "Automated Demand Response System and Advanced End-Use Services Platform," Optimal Technologies, 31 pages, Sep. 24, 2004.
Olson, "New Approaches in Automating and Optimizing Demand Response to Solve Peak Load Management Problems," Building IQ brochure, 8 pages, 2011.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Zaidi et al., "Load Recognition for Automated Demand Response in Microgrids," IEEE, pp. 2436-2439, 2010.

\* cited by examiner

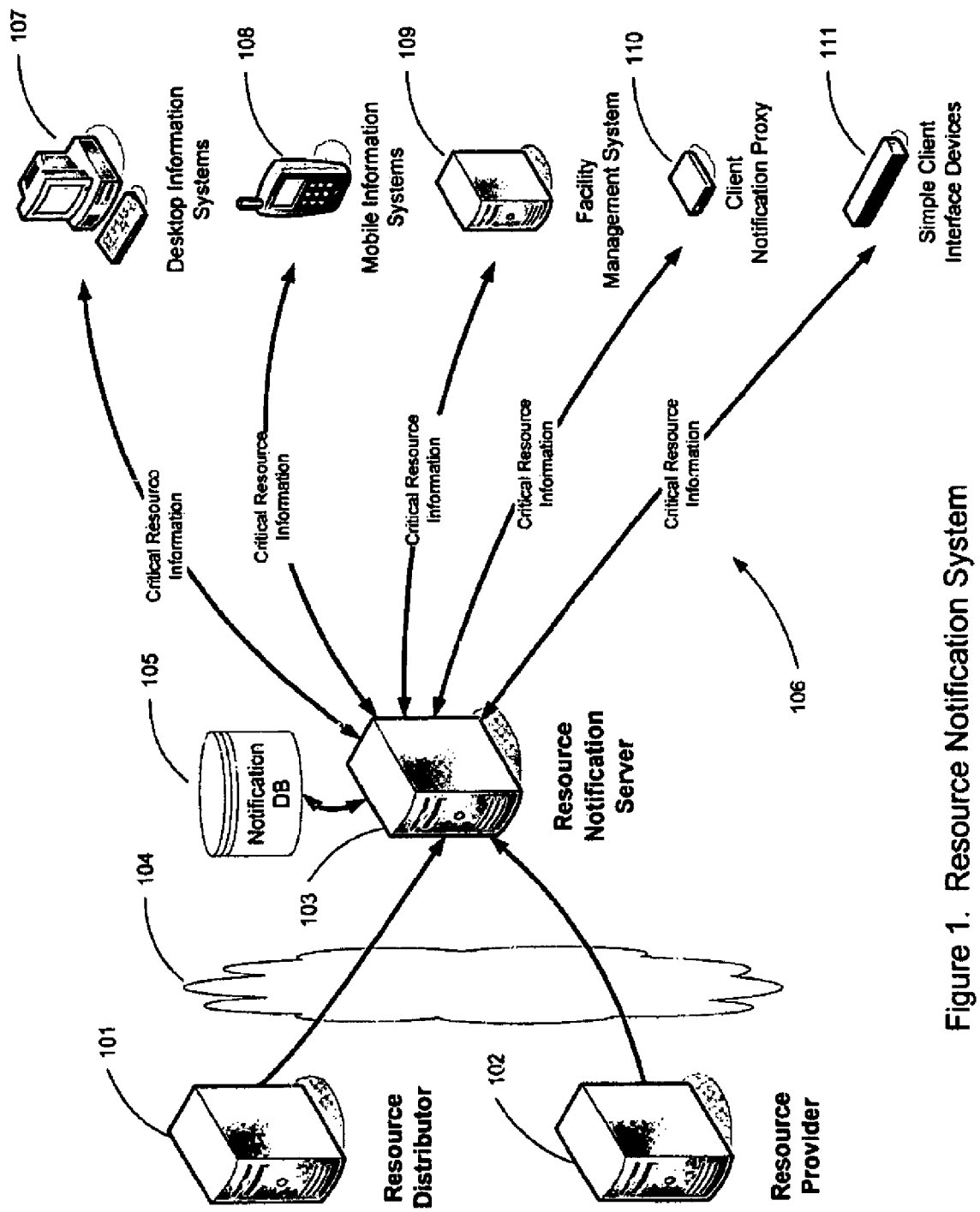
Figure 1. Resource Notification System

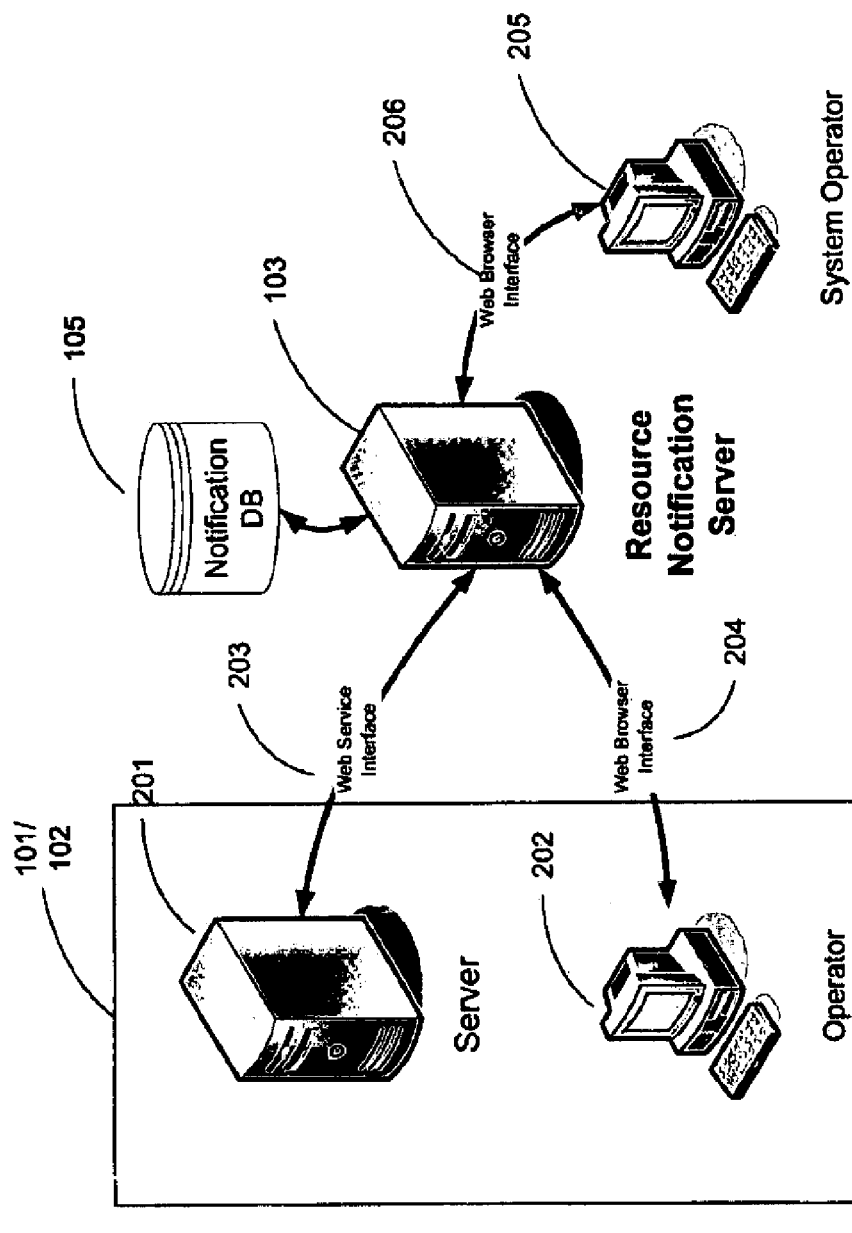
Figure 2. Resource Notification Server Operation

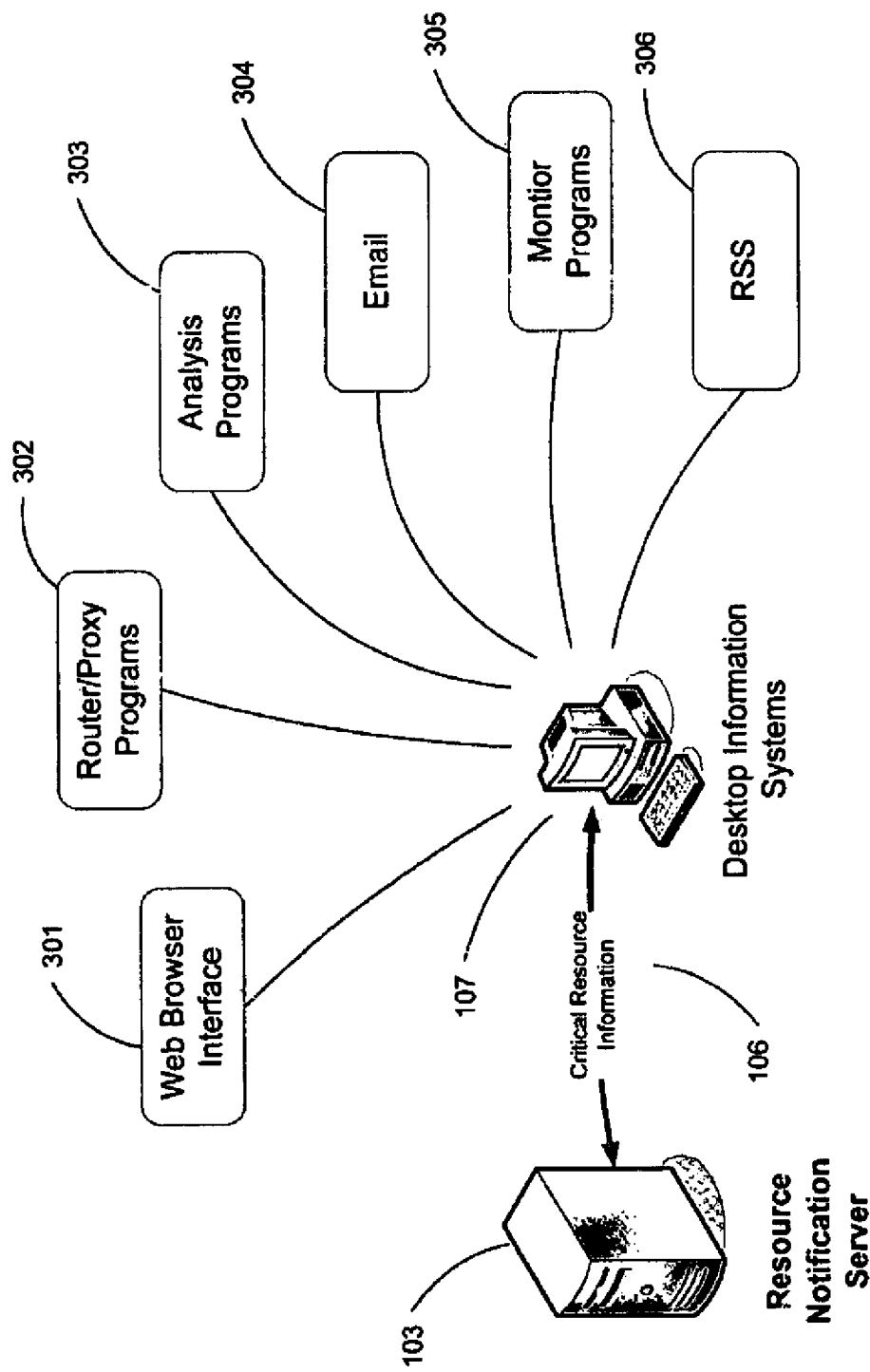
Figure 3. Desktop Information Systems

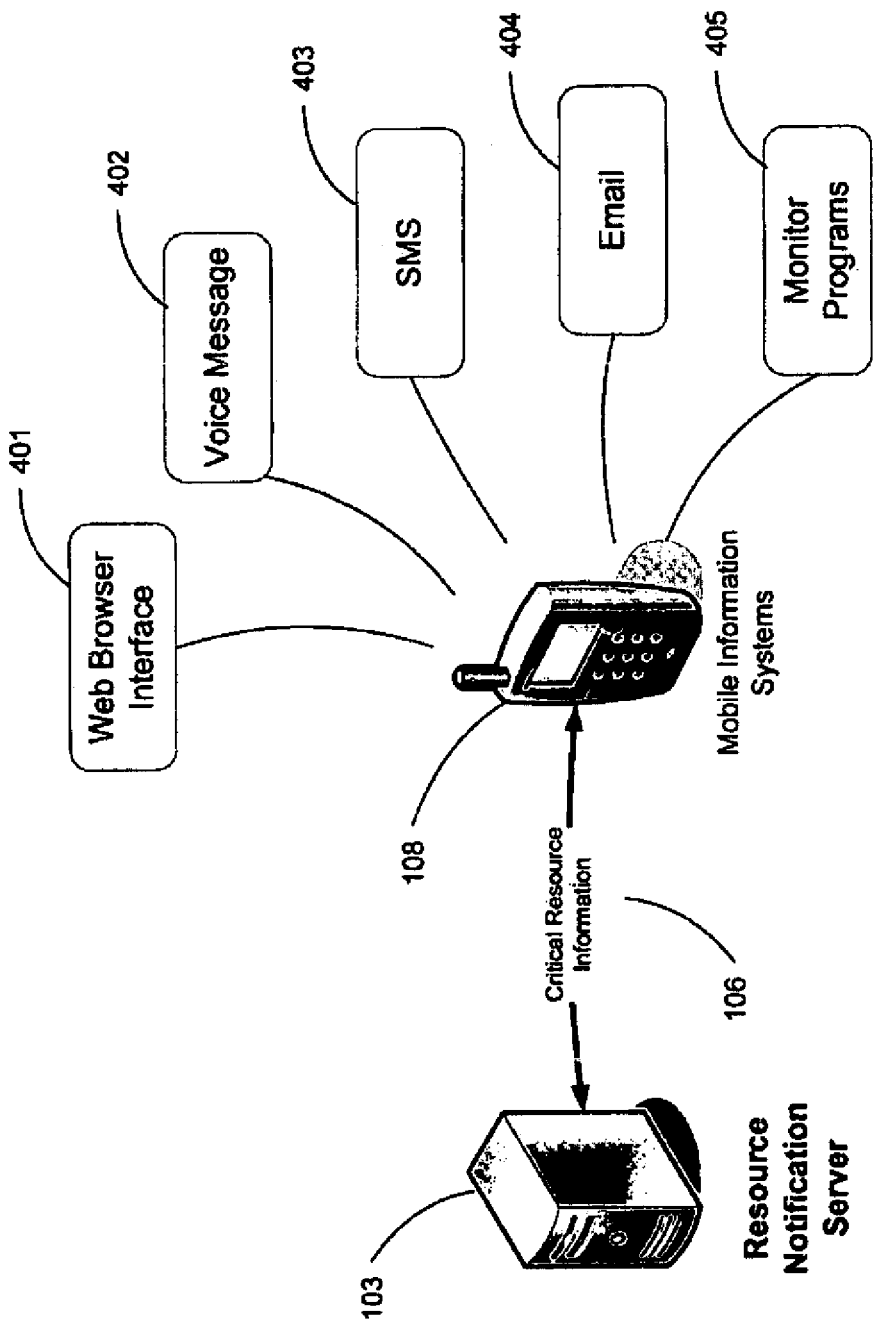
Figure 4. Mobile Information Systems

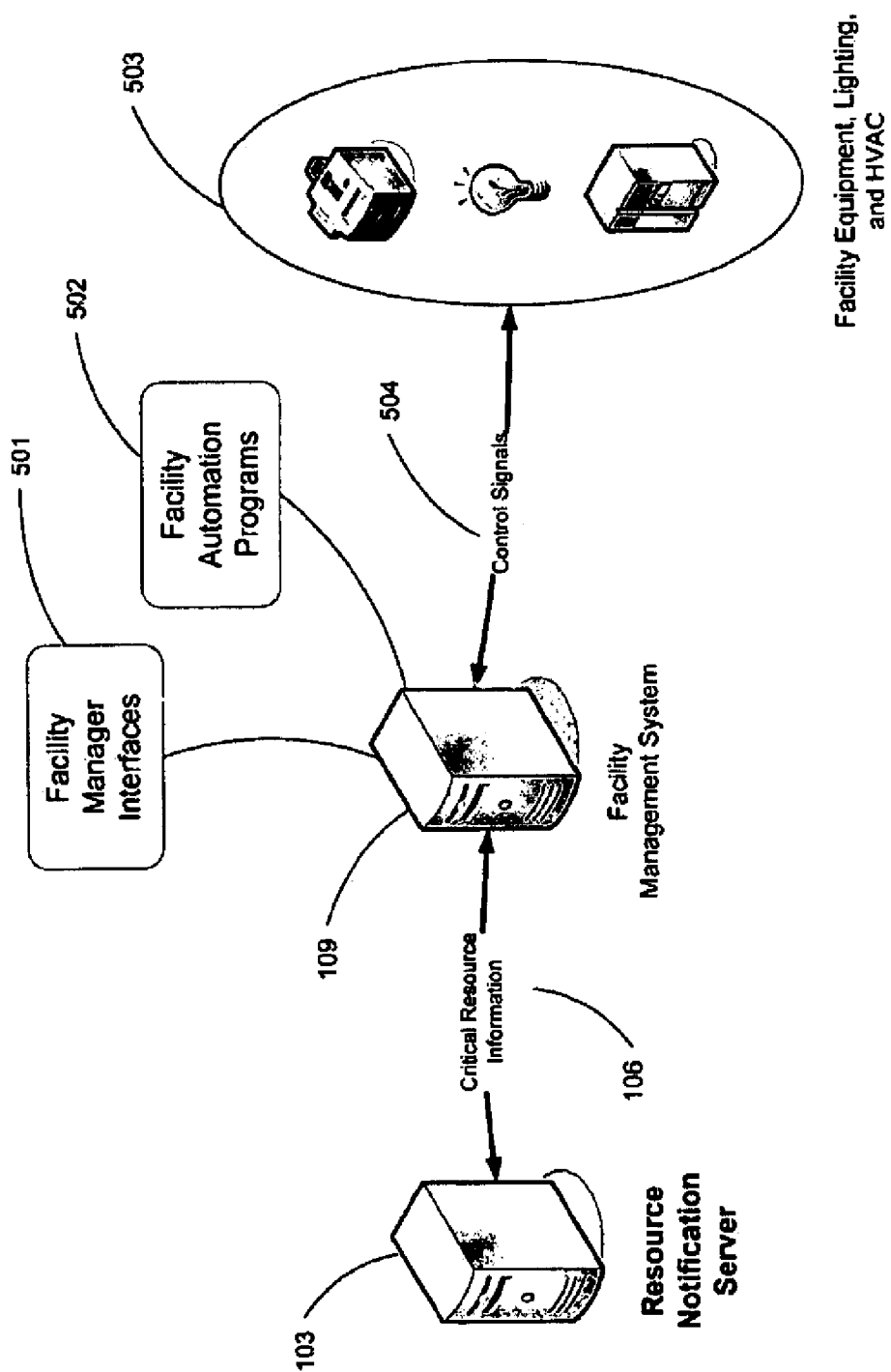
Figure 5. Facility Management Systems

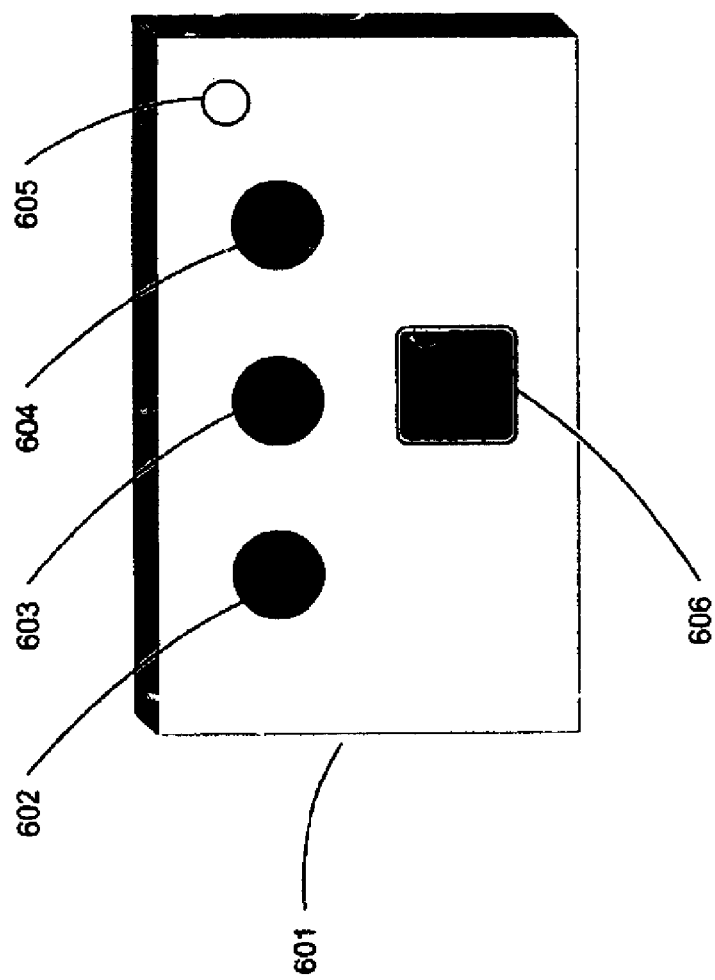
Figure 6. Example Simple Client Interface Device

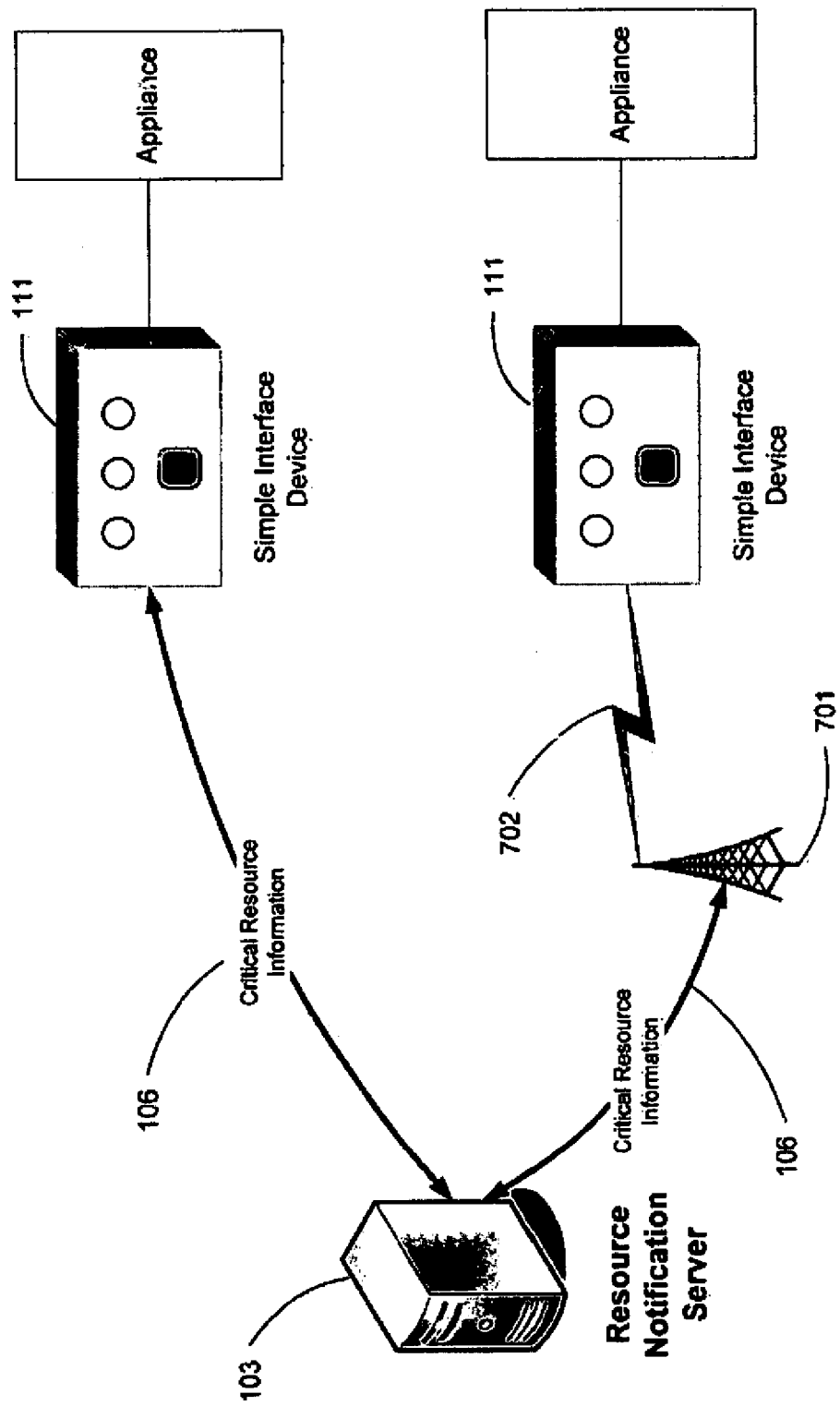
Figure 7. Simple Client Interface Devices

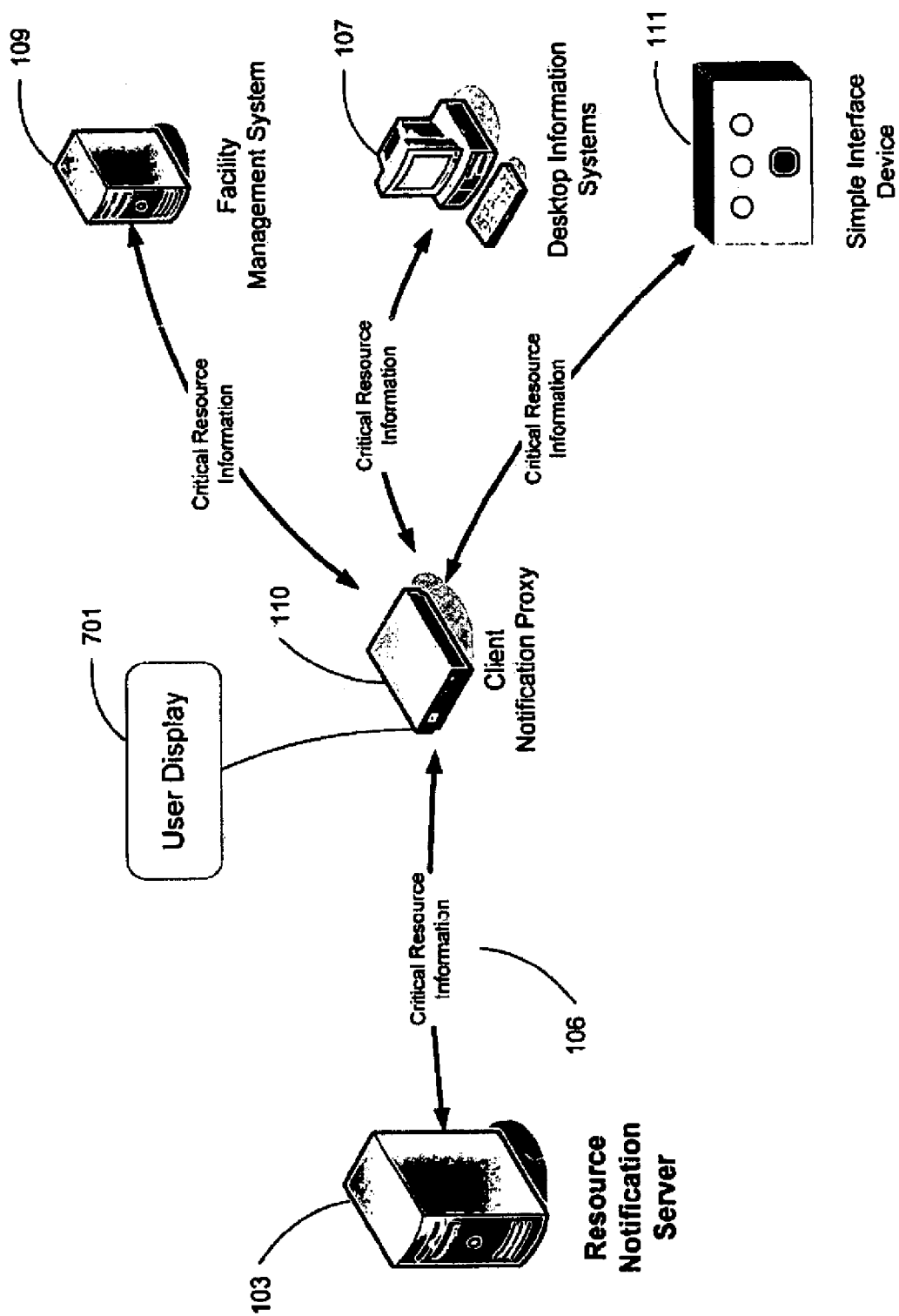
Figure 8. Client Notification Proxy

CRITICAL RESOURCE NOTIFICATION SYSTEM AND INTERFACE DEVICE

This application is a continuation of U.S. patent application Ser. No. 12/245,560, filed on Oct. 3, 2008, entitled "Critical Resource Notification System and Interface Device", which claims the benefit of U.S. Provisional Patent Application No. 60/977,909, filed on Oct. 5, 2007. U.S. patent application Ser. No. 12/245,560, filed on Oct. 3, 2008, is hereby incorporated by reference. U.S. Provisional Patent Application No. 60/977,909, filed on Oct. 5, 2007, is hereby incorporated by reference.

FIELD OF THE INVENTION

This invention relates to a critical resource notification system and networked interface device. More particularly, the invention relates to a critical resource notification system and networked interface device for the distribution of resources including, but not limited to, electricity, water, and natural gas.

BACKGROUND

Effective resource management is especially critical when communities are confronted with a scarcity of the resource in question. Resources include electricity, water, gas and natural resources such as oil. The definition of resources may also be extended to include water quality and air quality, since adequate water quality and air quality are necessary to support a self-sustaining environment.

Resource management is necessary so that systems can optimize the use of a limited resource. Currently, there are various systems for managing resources in various environments such as buildings, apartments, industrial facilities, and computing systems. Regretfully, these solutions have not been extended to individuals or small businesses, which account for a substantial portion of each utility's customers.

For example, when the usage of a resource such as electricity becomes strained in response to supply conditions, the result may be a "rolling blackout." A rolling blackout refers to an intentionally engineered electrical power outage that is caused by insufficient electrical power resources to meet demand for electricity. In California, rolling blackouts are triggered by unusually hot temperatures that cause a surge in demand resulting in heavy use of air conditioning. There are three emergency stages that identify the severity of the problem. In a Stage 1 emergency, a general call for voluntary conservation is issued. A Stage 2 emergency results in power being temporarily cut off to certain large users that have agreed to this arrangement in exchange for lower rates. When a Stage 3 emergency is issued, electric to one of the fourteen California grids is shut off for a fixed period of time that can range from 60 minutes to 2½ hours. If after this period of time the Stage 3 emergency still exists, power is restored to this grid but then the next grid in the sequence is blacked out, and so on, until the situation is stabilized. Thus, the blackout "rolls" from one grid to the next.

In California, each customer's electric bill includes the number of the power grid (from 1 to 14) that customer belongs to; this gives customers at least some advance notice of when their electricity might be turned off in the event of a Stage 3 emergency. The grids are set up in such a manner as to ensure that a large percentage of customers in the same neighborhood would not be blacked out concurrently, which could invite looting and other related problems. Normal electricity customers can fall within the areas reserved for emergency use if they are near a hospital or other critical infrastructure, in which case their electricity bill will indicate a power grid of 99 and they will not be affected by rolling blackouts.

One mechanism that is used to encourage customers to reduce demand and thereby reduce the peak demand for electricity is referred to as demand response (DR). DR refers to a mechanism to manage the demand for customers in response to supply conditions. For example, electricity customers must reduce their consumption at critical times or in response to market prices.

In demand response applications, customers shed loads in response to a request by a utility or market price conditions. Services are reduced according to a preplanned load prioritization scheme during critical timeframes. An alternative to load shedding is on-site generation of electricity to supplement the power grid. Under conditions of tight electricity supply, demand response can significantly reduce the peak price and, in general, electricity price volatility.

Generally, demand response technologies detect the need for load shedding, communicate the demand to participating users, automate load shedding, and verify compliance with demand-response programs. These systems are complex and costly to implement because they rely on controlling the usage of the resource.

Thus, there is a need for a system and device that does not rely on controlling the usage of the resource, that is cost effective to implement, and that satisfies the goals of a demand response application.

SUMMARY

A system and device that communicates critical resource information is described. The resource notification system comprises a resource distributor, a resource notification server, and a networked interface device. The resource distributor generates a demand response action that is associated with a particular resource. The resource distributor is also communicatively coupled to a wide area network. The resource notification server, which is also communicatively coupled to the wide area network, receives and processes the demand response action and generates a demand response event signal that is communicated to a customer list. Each customer has an associated networked interface device. The networked interface device comprises at least one indicator that is operatively coupled to at least one appliance. The networked interface device receives the demand response event signal that triggers the indicator corresponding to the demand response action generated by the resource distributor, wherein the indicator provides a real-time indication that corresponds to the usage of the particular resource.

The networked interface device communicates critical resource information. The networked interface device comprises at least one indicator that provides a real-time indication that corresponds to the usage of a particular resource. Additionally, the networked interface device comprises a means for being communicatively coupled to a wide area network and communicating with the resource notification server that receives a demand response action from the resource distributor as described above. Furthermore, the networked interface device comprises a means for interfacing with an appliance. Further still, the networked interface device comprises a means for processing the demand response event signal that triggers the indicator corresponding to the demand response action generated by the resource distributor.

DRAWINGS

The present invention will be more fully understood by reference to the following drawings which are for illustrative, not limiting, purposes.

FIG. 1 shows an illustrative Resource Notification System.

FIG. 2 shows the illustrative operation of the Resource Notification System.

FIG. 3 shows an illustrative desktop information system that provides customer notification.

FIG. 4 shows an illustrative mobile information system that provides customer notification.

FIG. 5 shows an illustrative facility management system that provides customer notification.

FIG. 6 shows an illustrative networked interface device.

FIG. 7 shows the use of a networked interface device for customer notification.

FIG. 8 shows the use of a proxy device for customer notification.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

The solution described herein provides close integration of an automated system that allows both the utility and the customer to pre-program levels of demand, cost and processes. The solution supports changing configurations through a Web Service that can also monitor the dynamic process of the shed scenarios.

The system, device and methods can be used to send critical notification to customers concerning some resource they consume such as electricity, water, or natural gas. Customers are typically entities such as businesses or consumers that use and obtain some resource from a provider of that resource. Typically, the customer purchases the resource from the provider based upon an agreed upon rate. When either the price or availability of the resource changes in some critical fashion then it may become necessary for the providers of the resource to notify the customer of this change so that they can modify their use of the resource accordingly.

The system, device and methods described herein allow critical notification of the availability of a resource with the expectation that customers will reduce their consumption thus maintaining the availability of the resource. Examples include electricity usage where a small reduction of the energy load by the customers could result in the avoidance of so called rolling blackouts as described above.

Referring to FIG. 1 there is shown an illustrative resource notification system and its associated elements. The illustrative notification comprises a resource distributor 101 and resource provider 102 that are communicatively coupled to the resource notification server 103 via a wide area network 104. The wide area network may be the Internet, an Intranet, an Extranet, or any other such wide area network. By way of example and not of limitation the wide area network is the Internet and communications are performed using the TCP/IP protocol suite.

Typically, the resource distributor 101 is a utility company such as an electrical company, a water company, a gas company, or any other such utility company that manages a resource. For illustrative purposes only, the resource distributor 101 is an electric company. The resource provider 102 is a more inclusive term that includes private companies that sell or provide resources to the resource distributor 101. An illustrative resource provider 102 is a private company generating electricity from solar power sells the electricity to the utility company.

The resource notification server 103 has a corresponding notification database 105. The notification database 105 comprises a list of customers such as individuals or families living in apartments and houses, and "entities" such as workers operating in small businesses that lease office space. In general, the notification database 105 includes a list of utility customers that use or access some resource.

The resource notification server 103 provides an alert or notification regarding the resource to networked interface devices that are communicatively coupled to the resource notification server 103. In operation, the resource notification server 103 communicates critical resource information to each of the networked interface device. By way of example and not of limitation, the critical resource information includes notification that there is a severe change in demand for the particular resource that results in an inability to use the resource. The critical resource information may also include communicate a significant change in demand for the particular resource that precedes the severe change in demand. Thus, critical resource information may include a notification that the price of electricity is going to increase 20% if the customer elects to continue using a particular appliance.

In the illustrative embodiment, the networked interface devices include a desktop information system 107, a mobile information system 108, a facility management system 109, a customer notification proxy 110, and simple customer interface device 111.

In operation, the resource distributor 101 or resource provider 102 sends a notification to the resource notification server 103 that indicates a "status" to resource notification server 103. The resource notification server 103 interprets the notification and generates price levels and demand response event signals are published as services to each of the networked interface devices.

In the illustrative embodiment, the resource notification server operates as a Web Service. A Web Service is a software system that is designed to support interoperable machine-to-machine interactions over a network. Generally, customers and servers communicate using XML messages that follow the Service Oriented Architecture Protocol (SOAP) standard. SOAP is an XML-based, extensible message envelope format, with bindings to underlying protocols. The primary protocols are HTTP and HTTPS, although bindings for other protocols shall be appreciated by those of ordinary skill in the art having the benefit of this disclosure.

Referring to FIG. 2 there is shown an illustrative operation of the resource notification server described above. The resource distributor 101 or 102 generates a demand response action or notification that is associated with a particular resource. A server 201 or operator 202 may generate the demand response action that is communicated via a Web Service Interface 203. The demand response action corresponds to a change in demand for a particular resource. In the illustrative embodiment, the Web Service Interface 203 is an XML interface with a predetermined mechanism that triggers the generation of the demand response action. The operator 202 may then proceed to confirm that the demand response action is the appropriate notification to be communicating to the resource notification server 104. By way of example and not of limitation, the operator 202 provides this confirmation using a web browser interface 204.

The resource notification server 103 that is also communicatively coupled to the wide area network receives and processes the demand response action and generates a demand response event signal that is communicated to a customer list that is extracted from the notification database 105. Each customer has an associated networked interface device as described in further detail below.

A system operator 205 manages the resource notification server 103 with a web browser interface 206. Depending on the particular application, the system operator 205 may operate remotely or may operate locally. Regardless, the web browser interface 206 provides a simple interface for the control of the resource notification server 103.

FIG. 3 shows an illustrative desktop information system that provides customer notification. The illustrative desktop information system 107 receives the critical resource information 106. The critical resource information 106 comprises a demand response event signal generated by the resource notification server 103. Thus, the demand response event signal is a subset of the critical resource information 106. The demand response event signal corresponds to a change in demand for the particular resource.

In operation, the desktop information system 107 interfaces with the resource notification server 103 using a web browser interface 301. The desktop information system 107 performs a variety of different tasks using router/proxy programs 302, analysis programs 303. Updates regarding the critical resource information are communicated using e-mail 304, monitoring programs 305, and RSS feeds 306.

For example, when a utility or Independent System Operator (ISO) predicts a spike in energy demand based on ambient temperature. The utility then proceeds to signal a change in cost using a bid program alert through demand response application server such as the resource notification server 103. The price-level and demand response event signals are transmitted to facilities and published as Web services. Polling customers having the appropriate CLIR and software request price-levels every minute. EMS and lighting control systems carry out a power demand shed. An interface to a Programmable Communicating Thermostat may accomplish this.

Referring to FIG. 4 there is shown an illustrative mobile information system that provides customer notification. The mobile information system 108 may receive a notification via a web browser 401, voice message 402, SMS 403, e-mail 403, monitoring programs 405, or other such notification means configured to be communicated to a mobile information system 108. The mobile information system may be Wi-Fi enabled, enabled to communicate using cellular frequency bands, or a combination thereof.

Referring to FIG. 5 there is shown an illustrative facility management system that provides customer notification. In this embodiment, the critical resource information is communicated from the resource notification server 103 to the facility management system 109. The facility management system includes a simple interface 501 and facility automation programs 502. The facility management system proceeds to generate control signals 504 that are communicated to facility equipment 503 that includes printers, lighting, server farms, refrigeration units, uninterruptible power supplies, and other such facility equipment.

The facility management system 109 provides a simple client interface that is used to control the facility equipment. For example, the facility management system 109 is configured to reduce power consumption by interfacing with the electrical controls in a building and providing pre-programmed routines to reduce the power load upon receipt of critical resource information.

Referring to FIG. 6 there is shown an illustrative networked interface device. The illustrative networked device 601 comprises at least one indicator. By way of example and not of limitation, a plurality of visible indicators are utilized in an appliance alert system. The networked interface device 601 communicates critical resource information such as a demand response action directly to the customer. The indicators for the networked interface device include visible, auditory, or audio-visual indicators that provide a real-time indication that corresponds to the usage of a particular resource.

The illustrative networked interface device 601 comprises a first visible indicator 602 that is shown as green, a second visible indicator 603 that is represented by a yellow color, and a third visible indicator 604 that is red, a fourth visible indicator 605 and a button 606. The illustrative button 606 is an on/off button and the fourth visible indicator 605 indicates that the networked device has network connectivity; so the visible indicator 605 may also blink at various frequencies and be solid to further indicate the degree or level of network connectivity that has been reached.

Additionally, the networked interface device 601 comprises a means for being communicatively coupled to a wide area network and communicating with the resource notification server that receives a demand response action from the resource distributor as described above.

Furthermore, the networked interface device 601 comprises a means for interfacing with an appliance. The appliance may be selected from a group of appliances consisting of an air conditioner, an oven, a heater, a refrigerator, a washer, a dryer, a range, a television, a computer, a water heater, a water cooler, a coffee maker, and a microwave.

Further still, the networked interface device 601 comprises a means for processing the demand response event signal that triggers at least one visible indicator corresponding to the demand response action generated by the resource distributor. In operation, the networked interface device 601 receives; the demand response event signal that triggers at least one visible indicator corresponding to the demand response action generated by the resource distributor. The visible indicator provides a real-time indication that corresponds to the usage of the particular resource.

For example, the red visible indicator 604 may communicate a severe change in demand for the particular resource that results in an inability to use the resource. More specifically, the red visible indicator 604 may indicate that use of the appliance is occurring during peak demand and shall result in a "brownout" or rolling blackout. Additionally the red visible indicator 604 may indicate that a severe price change shall take place such as a 15% increase in power for the next two-hour period. Thus, the red visible indicator 604 communicates to a customer that the use of the appliance is not recommended because the impact to the customer may be severe.

The yellow indicator 603 may communicate a significant change in demand for the particular resource. Typically, the yellow indicator 603 precedes the severe change in demand that is communicated with the red visible indicator 604. For example, the yellow indicator 603 indicates that there is currently a high energy demand, or that there is an increased cost differential, or a combination thereof. The illustrative green indicator 602 may communicate that electrical demand is low and that operation of the appliance does not affect the availability of the resource.

Referring to FIG. 7 there is shown two different embodiments of the networked interface device 111 for customer notification in communication with resource notification server 103. In the first embodiment, the networked interface device 111 communicates with a resource notification server 103 using a hard wired network connection such a telephone line, a cable, or any other such physical interface. In the second embodiment, the networked device 111 is communicatively coupled to the resource notification server 103 using a wireless communication technology 702. The wireless communication technology 702 includes, by way of example and not of limitation, CDMA, GSM or UMTS or any other wireless communication system such as Wi-Fi or WiMAX.

Referring to FIG. 8 there is shown the use of a proxy device for customer notification. The proxy device 110 includes a user display 701. Generally, the client notification proxy 110 is behind a firewall (not shown) and receives critical resource information 106 from the resource notification server 103. The critical resource information 106 is communicated via the client notification proxy 110 to the facility management system 109, desktop information system 107, and the networked interface device 111. The operations of the facility management system 109, desktop information system 107, and networked interface device have been described above.

In operation, the client notification proxy 110 is configured to communicate with the resource notification server 103 over the wide area network. The client notification proxy 110 then communicates the critical resource information to devices and systems that are in within its' local area network. The client notification proxy 110 may operate within a small commercial enterprise or residence.

It is to be understood that the detailed description of illustrative embodiments are provided for illustrative purposes. The scope of the claims is not limited to these specific embodiments or examples. For example, a networked interface device 111 has been described, however this solution may be extended to any source electronic device having the properties of the networked interface device described herein. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A resource notification system comprising:
a resource notification server;
a database memory connected to the resource notification server;
one or more networked interface devices connected to the resource notification server; and
a resource provider/distributor connected to the resource notification server; and wherein:
the resource provider/distributor generates a demand response action for a resource and provides the demand response action to the resource notification server using a processor;
the resource notification server processes the demand response action and generates a demand response event signal;
the demand response event signal is provided to the one or more networked interface devices; an indicator provides a real-time indication of a usage of the resource; and the real-time indication of a usage of the resource reveals a significant change in demand for the resource, a severe change in demand of the resource, or no change; and a change in demand means that demand is approaching or going to exceed an available supply of the resource.

2. The system of claim 1, wherein the indicator which is triggered by the demand response event signal.

3. The system of claim 1, wherein the database memory comprises a list of customers.

4. The system of claim 3, wherein the real-time indication of a usage of the resource is provided to at least one customer on the list of customers.

5. The system of claim 1, wherein
the change in demand indicates a change in price and/or availability of the resource; and
if a customer receives the indication of usage of the resource which reveals a change in demand for the resource, then the customer purchases the resource at a changed agreed upon rate for the resource, or modifies its usage of the resource particularly if availability of the resources changes.

6. The system of claims 1, wherein:
the one or more networked interface devices are connected to the resource notification server via a wide area network; and
the resource provider/distributor is connected to the resource notification server via the wide area network.

7. The system of claim 6, wherein the one or more networked interface devices comprises one or more items of a group consisting of desktop information systems, mobile information systems, facility management systems, client management proxies and simple client interface devices.

8. A method for communicating critical resource information, comprising:
providing a resource provider/distributor:
providing a resource notification server;
providing one or more networked interface devices;
the resource provider/distributor making available a resource to one or more customers;
the resource provider/distributor conveying a notification that indicates a status to a resource notification server;
the resource notification server generating critical resource information from the notification;
the resource notification server communicating the critical resource information to the one or more networked interface devices; the critical resource information comprises demand response event signals; and wherein the demand response event signals comprise: an indication of a severe change in demand for a resource which results in an unavailability of the resource Without a price increase; an indication of a significant change in demand for the resource which precedes the Severe change in demand; or an indication of a low demand for The resource which results in virtually no effect on availability of the resource without a change in price.

9. The method of claim 8, further comprising selecting the one or more networked interface devices from a group consisting of desktop information systems, mobile information systems, facility management systems, client notification proxies and simple client interface devices.

10. The method of claim 8, wherein:
the resource provider/distributor comprises a resource server and a resource operator;
the notification comprises a demand response action; and
the demand response action is generated by the resource server and confirmed by the resource operator.

11. The method of claim 10, further comprising:
conveying the demand response action to the resource notification server;
generating demand response event signals from the demand response action with the resource notification server for the one or more customers; and
communicating the demand response event signals to the one or more network interface devices: and
wherein:
the one or more customers have an associated networked interface device;
the demand response event signals trigger at least one indicator corresponding to the demand response action; and
the associated networked interface device comprises the at least one indicator for observation by the one or more customers.

12. The method of claim 8, further comprising:
managing the resource notification server by a system operator with a web browser interface; and
wherein the web browser interface provides a simple interface for control of the resource notification server.

13. The method of claim 8, wherein:
the one or more network interface devices receive the critical response information from the resource notification server;
the demand response event signals are a subset of the critical resource information; and
the demand response event signals correspond to a change in demand for the resource.

14. The method of claim 13, wherein:
the demand response event signals trigger at least one indicator corresponding to the demand response action generated by the resource provider/distributor; and
the at least one indicator provides a real-time indication which corresponds to a usage of the resource.

15. A resource information mechanism comprising:
a resource notification server;
a resource provider/distributor having a communicative connection with the resource notification server; and
one or more networked interface devices having a communicative connection with the resource notification server; and
wherein:
the communicative connections are wired and/or wireless connections;
the resource provider/distributor provides a notification indicating status to the resource notification server;
the status is expressed by a demand response action;
the resource notification server using a processor, generates a demand response event signal from the demand response action;
the demand response event signal is provided via the communicative connection to the one or more networked interface devices; and
the one or more networked interface devices provide an indication array of usage of the resource to one or more customers.

16. The mechanism of claim 15, wherein the indication array comprises:
a first indication that there is a severe change in demand for a resource which results in an inability to use the resource;
a second indication that there is a significant change in demand for the resource which precedes the severe change in demand; and/or
a third indication that the demand for the resource is low and use of the resource has virtually no affect on availability of the resource.

* * * * *